US006179120B1

United States Patent
Chou

(10) Patent No.: US 6,179,120 B1
(45) Date of Patent: Jan. 30, 2001

(54) STORAGE BOX FOR COMPACT DISK

(75) Inventor: Shou Ming Chou, Taipei Hsien (TW)

(73) Assignee: Ritek Corporation, Hsin Chu Industrial Park (TW)

( * ) Notice: Under 35 U.S.C. 154(b), the term of this patent shall be extended for 0 days.

(21) Appl. No.: 09/401,518

(22) Filed: Sep. 22, 1999

(51) Int. Cl.$^7$ .................................................. B65D 85/57
(52) U.S. Cl. ......................... 206/308.1; 206/310; 206/493
(58) Field of Search ....................... 206/305.1, 309–312, 206/493

(56) References Cited

U.S. PATENT DOCUMENTS 5,494,156 * 2/1996 Nies ................................... 206/308.1
5,660,274 * 8/1997 Chien ................................ 206/308.1
5,829,582 * 11/1998 Ippolito et al. ................... 206/308.1

* cited by examiner

Primary Examiner—Paul T. Sewell
Assistant Examiner—Shian Luong
(74) Attorney, Agent, or Firm—Rosenberg, Klein & Lee

(57) ABSTRACT

A low-profile storage box comprises only a base and a cover, which are pivotally connected on one side thereof and can be operated to open. The base has a locking means at center thereof, which comprises a plurality of projecting and equally spaced L-shaped pedals. The pedals at even order have a slanting arm extended from the front side thereof and connected to a circular plate. The pedals at odd order are inclined with a specific angel to the vertical wall of the base to facilitate the mounting of compact disk. The low-profile storage box has height of 5 mm–7 mm only.

4 Claims, 4 Drawing Sheets

STORAGE BOX FOR COMPACT DISK

FIELD OF THE INVENTION

The present invention relates to a storage box for compact disk, especially to a low-profile storage box for storing one-piece of compact disk.

BACKGROUND OF THE PRESENT INVENTION

The conventional storage boxes for compact disk are mostly used to store one-piece of compact disk. As shown in FIGS. 6 and 7, one conventional storage box for compact disk generally comprises a cover 4, a base 5 and an inner pad 6 in three-pieces assembly. The inner pad 6 has a locking means 61 at the center thereof, which comprises a plurality of equally-spaced L-shaped pedals 62. The plurality of equally spaced L-shaped pedals 62 are used to clamp the center hole of the compact disk such that the compact disk is secured on the inner pad 6. Moreover, the cover and base have bumps and corresponding grooves on the peripheral thereof, by which the cover is locked on the base. However, this is not feature of the present invention, the detailed description is omitted for clarity. The base and the inner pad together have thickness about 10 mm, which is larger than the thickness of compact disk and is not desirable. The inner pad has same material as the base, the stacking arrangement of pad on base to form an accommodating space for compact disk waste material.

It is an object of the present invention to provide a low-profile storage box for storing one-piece of compact disk and having simple structure.

In one aspect of the present invention, the inventive low-profile storage box comprises only a base and a cover and the base has a locking means with specially designed L-shaped pedals. By this design, the mounting and fetching of compact disk are convenient.

In another aspect of the present invention, the low-profile storage box comprises only a base and a cover, which are pivotally connected on one side thereof and can be operated to open. The base has a locking means at center thereof, which comprises a plurality of projecting and equally spaced L-shaped pedals. The pedals at even order have a slanting arm extended from the front side thereof and connected to a circular plate. The pedals at odd order are inclined with a specific angel to the vertical wall of the base to facilitate the mounting of compact disk.

The various objects and advantages of the present invention will be more readily understood from the following detailed description when read in conjunction with the appended drawing, in which:

DETAILED DESCRIPTION OF THE PREFERRED EMBODIMENT

Figure 1:
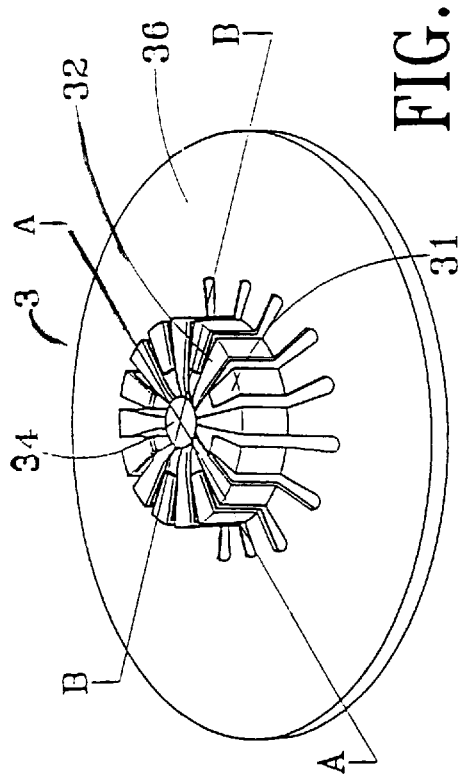
FIG. 1 is a perspective view of the locking means according to the present invention.
Figure 2:
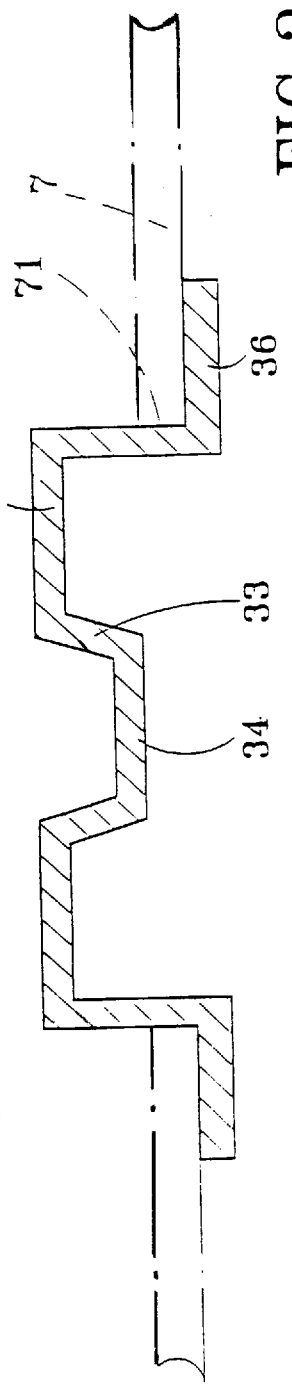
FIG. 2 is a cross section view along the line A—A of FIG. 1.
Figure 3:
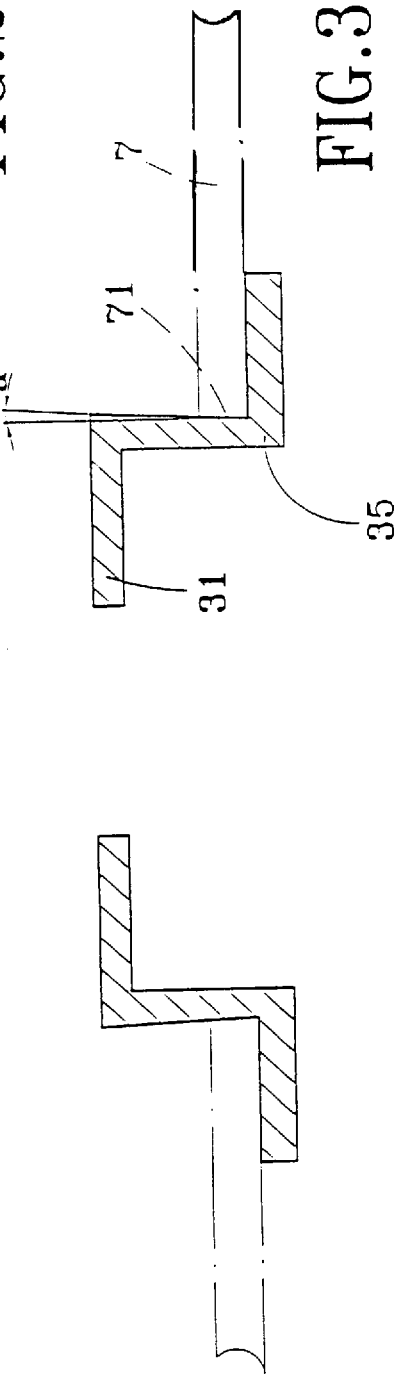
FIG. 3 is a cross section view along the line B—B of FIG. 1.
Figure 4:
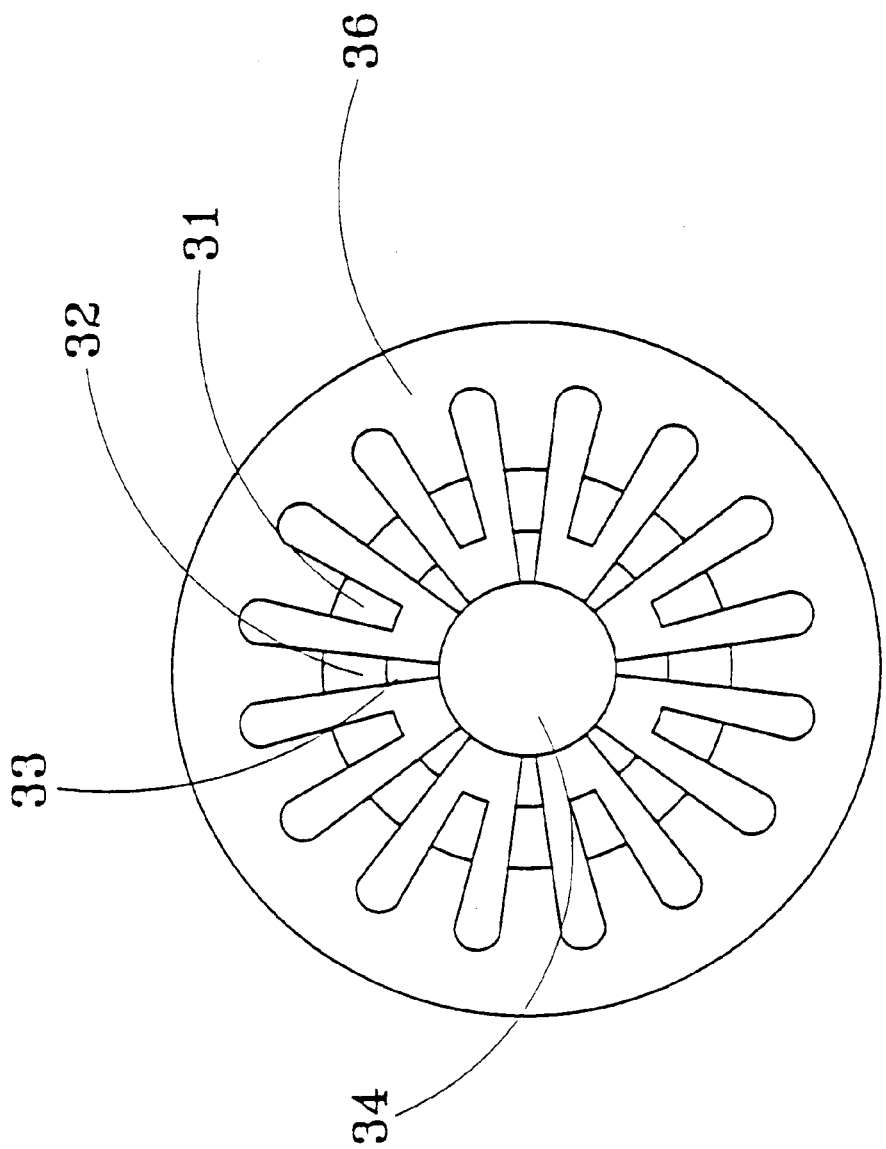
FIG. 4 is the top view of the locking means shown in FIG. 1.
Figure 5:
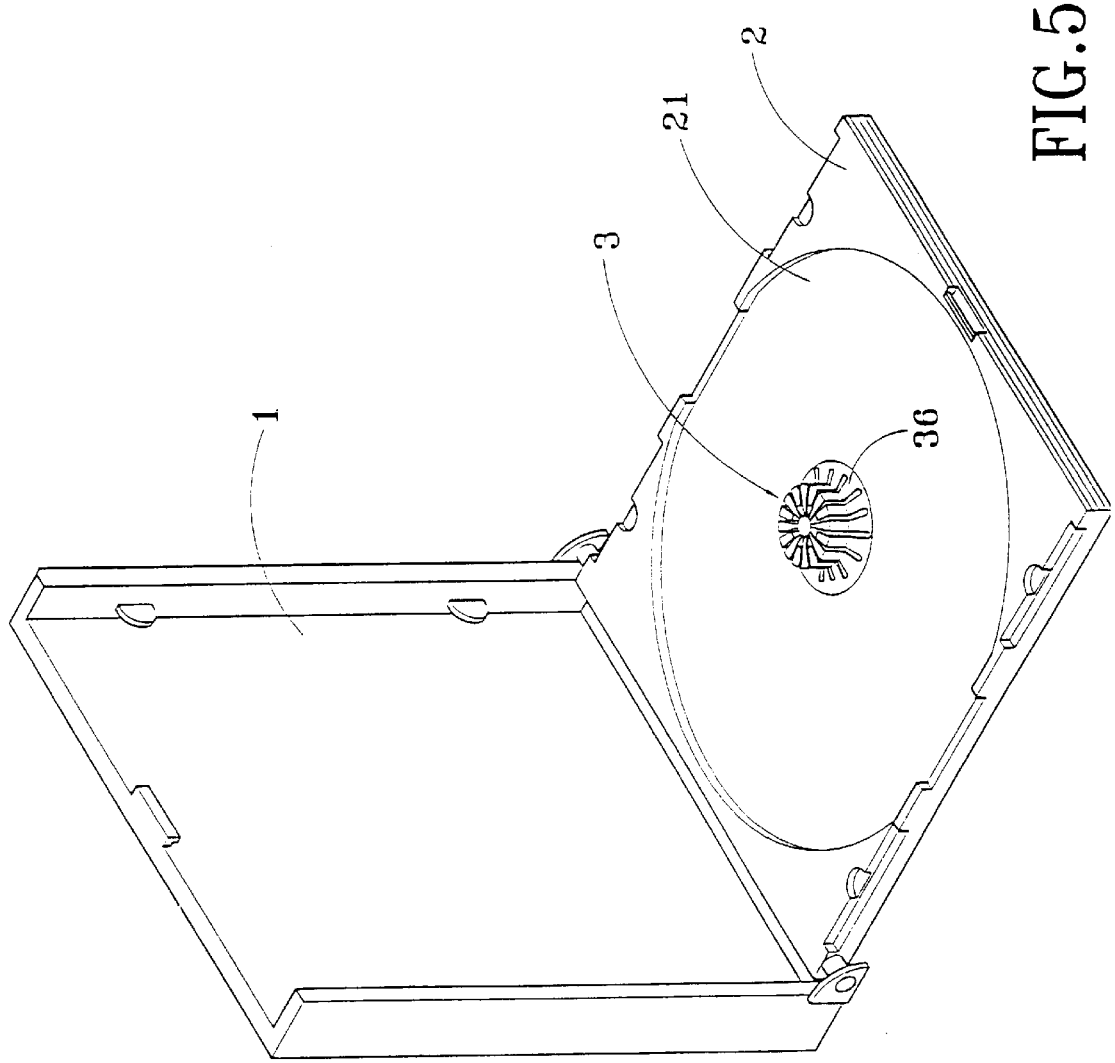
FIG. 5 is a perspective view of the present invention.
Figure 6:
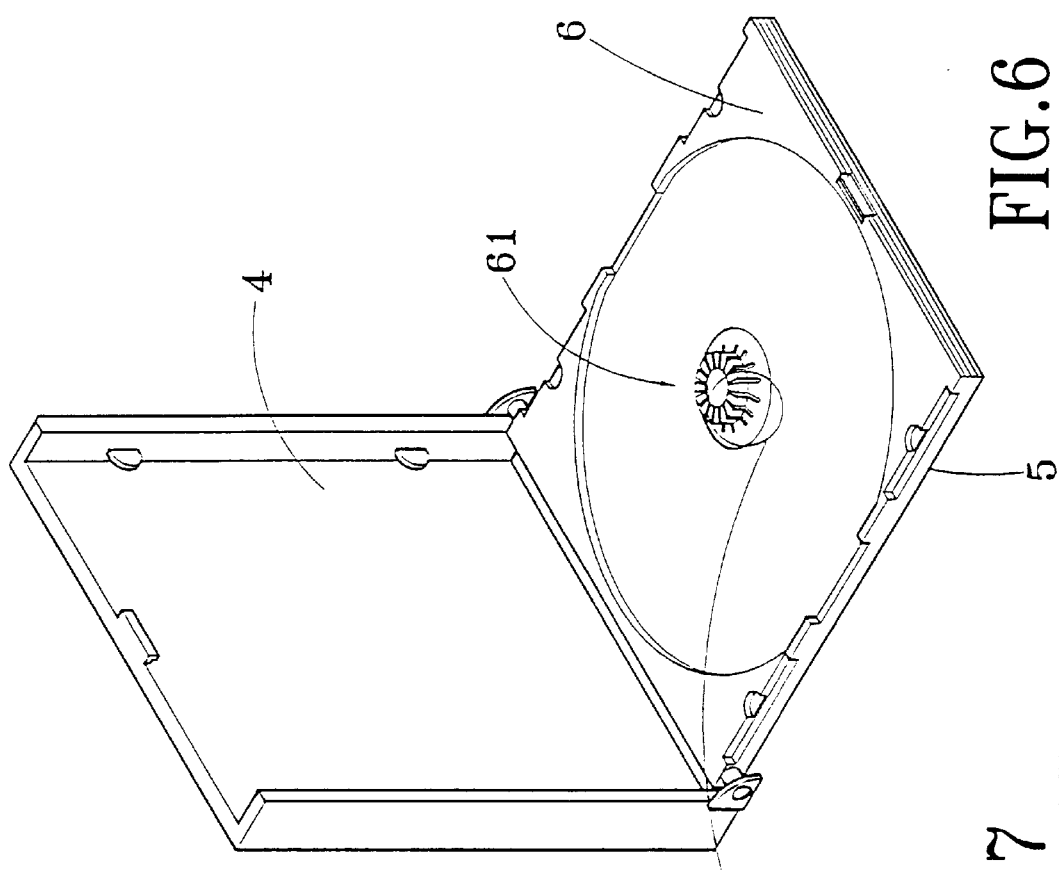
FIG. 6 is an exploded view of a conventional storage box for compact disk.
Figure 7:
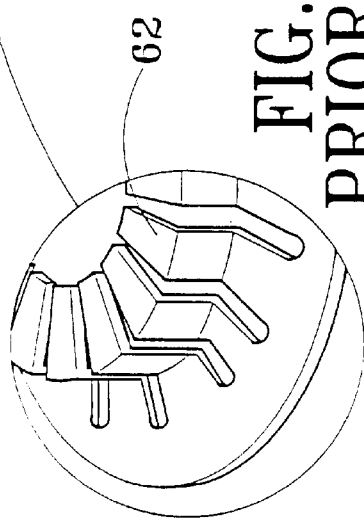
FIG. 7 is a partially enlarged view of the locking means of a conventional storage box for compact disk.

As shown in FIGS. 1 to 5, the storage box for compact disk according to the present invention comprises a cover 1 and a base 2, which are pivotally connected on one side thereof and can be operated to open. The base 2 has a locking means 3 at center thereof, which comprises a plurality of projecting and equally spaced L-shaped pedals 31 and 32. The pedals 32 at even order have a slanting arm 33 extended from the front side thereof and connected to a circular plate 34, as shown in FIG. 2. The pedals 31 at odd order are inclined with a specific angle a to the vertical wall 35 of the base 2 to facilitate the mounting of compact disk 7. In other word, by the inclined pedals 33, the central hole 71 of the compact disk 7 can be easily mounted on the L-shaped pedals 31 and 32. Moreover, the plurality of L-shaped pedals 31 and 32 can also separately formed, rather than integrally formed with the base 2. When the plurality of L-shaped pedals 31 and 32 are separately formed, they have peripheral portion 36.

More particularly, the plurality of L-shaped pedals are classified into two categories. The first category of pedals 32 are arranged in even order and have both ends connected with the base 2. Therefore, the structural strength of the locking means 3 is ensured. The second category of pedals 31 are arranged in odd order (alternating with the pedal 32) and have one end floating to provide flexibility to the locking means 3. By this flexibility, the compact disk can be easily mounted on or fetched from the locking means. The locking means 3 is integrally formed with the base 2, the overall height of the storage box is greatly reduced to about 5 mm–7 mm. More particularly, an annual shape accommodating space 21 for compact disk 7 is formed on the top surface of the base 2, thus achieving a low-profile storage box for compact disk.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An apparatus for retaining a compact disk within a storage case in releasably locked manner comprising:
   (a) a substantially planar central plate defining a central axis;
   (b) a plurality of first pedals disposed substantially in equally spaced manner about said central plate, each said first pedal having a substantially L-shaped outer portion and a radial portion extending radially inward therefrom to said central plate, said radial portion having a substantially level outer section and a linearly sloped slanting arm section, said slanting arm section connecting said outer section to said central plate; and,
   (c) at least one second pedal disposed in deflectable manner between adjacent ones of said spaced first pedals, each said second pedal having a substantially L-shaped outer portion and a terminal portion extending radially inward therefrom, said outer portion including a linearly sloped wall inclined away from a vertical reference by a predetermined nonzero angle.

2. A compact disk storage case comprising:
   (a) a base defining a compartment for receiving the compact disk;

(b) a cover displaceably coupled to said base for enclosing said compartment;

(c) a locking mechanism coupled to said base and disposed within said compartment, said locking mechanism including:

(1) a substantially planar central plate defining a central axis;

(2) a plurality of first pedals disposed substantially in equally spaced manner about said central plate, each said first pedal having a substantially L-shaped outer portion and a radial portion extending radially inward therefrom to said central plate, said radial portion having a substantially level outer section and a linearly sloped slanting arm section, said slanting arm section connecting said outer section to said central plate; and, (3) a plurality of second pedals each disposed in deflectable manner between adjacent ones of said spaced first pedals, each said second pedal having a substantially L-shaped outer portion and a terminal portion extending radially inward therefrom, said outer portion including a linearly sloped wall inclined away from a vertical reference by a predetermined non-zero angle.

3. The apparatus as recited in claim 2 wherein said locking mechanism is integrally formed on said base.

4. The apparatus as recited in claim 2 wherein said locking mechanism includes a peripheral portion coupling together said outer portions of said first and second pedals, said peripheral portion being fastened to said base.

* * * * *